Figure 1:
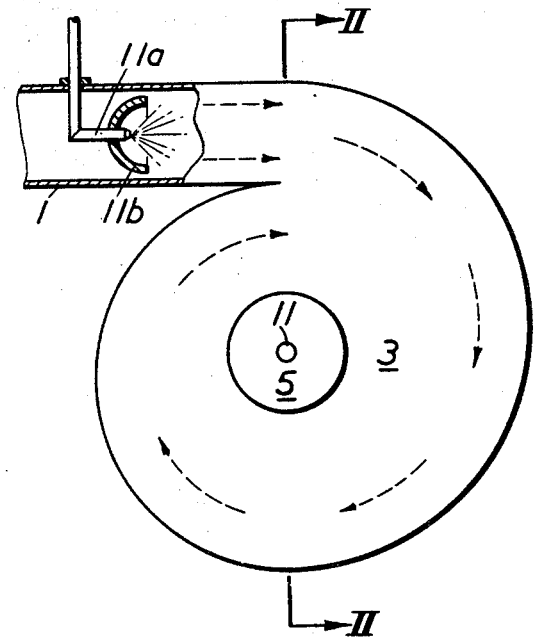

April 12, 1955 P. LLOYD 2,706,150
GAS PRODUCER FOR USE WITH A TURBINE POWER PLANT
Filed Dec. 27, 1949 2 Sheets-Sheet 1

Inventor
Peter Lloyd
By Stevens, Davis, Miller & Mosher
his Attorneys

United States Patent Office 2,706,150
Patented Apr. 12, 1955

2,706,150

GAS PRODUCER FOR USE WITH A TURBINE POWER PLANT

Peter Lloyd, Farnham, England, assignor to Power Jets (Research and Development) Limited, London, England, a British company Application December 27, 1949, Serial No. 135,057

Claims priority, application Great Britain January 14, 1949

1 Claim. (Cl. 48—72)

This invention relates to improvements in gas turbine plant of the kind operating on combustible gases derived from the partial combustion of fuel, for example, coal, in a gas producer. A disadvantage of hitherto known plant of this kind is that the gases are generated in a gas producer containing a static bed of fuel and a considerable period is required for such a producer to become fully operative; conversely after the plant is shut down the producer continues to generate gases for some considerable time and much energy is therefore wasted. Accordingly such plant is not very suitable for standby purposes when additional power is required quickly.

A further disadvantage of such plant is that it is generally bulky and consequently occupies considerable space.

An object of the invention is to obviate these difficulties and to provide a relatively compact gas turbine plant which will respond rapidly to starting and shutting down operations.

Accordingly the invention provides a gas turbine plant wherein a compressor driven by a turbine delivers air to a gas producer in which a gas-producing carbonaceous material is subjected to combustion in a deficient supply of air while said material is carried along by a flow of combustion supporting gaseous fluid, the combustible gases generated being led to a combustion chamber and the gaseous products derived thereby being led to drive said turbine.

According to a further feature the invention provides a gas turbine plant wherein a compressor driven by a turbine delivers air to a gas producer comprising a vortex chamber having means for setting up therein a radially inward vortex flow of gaseous fluid which leaves the chamber through an axial outlet, particles of gas-producing carbonaceous material being delivered into and carried along by said flow and subjected to partial combustion to produce combustible gas which is led to a combustion chamber, the gaseous products derived thereby being led to drive said turbine.

Part of the air delivered by the compressor may be led directly to the combustion chamber while another part is led to the gas producer, preferably through a booster pump and an air heater. The gas producer is preferably operated at a temperature above that of ash fusion and suitable provision is made for slag removal. The plant may include a steam generator for injecting steam into the gas producer.

Figure 2:
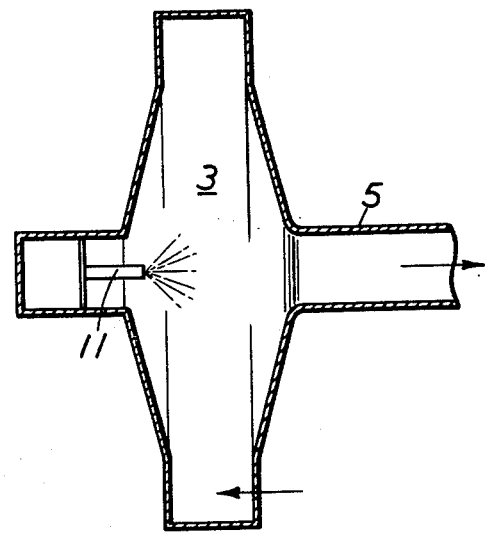
Figure 3:
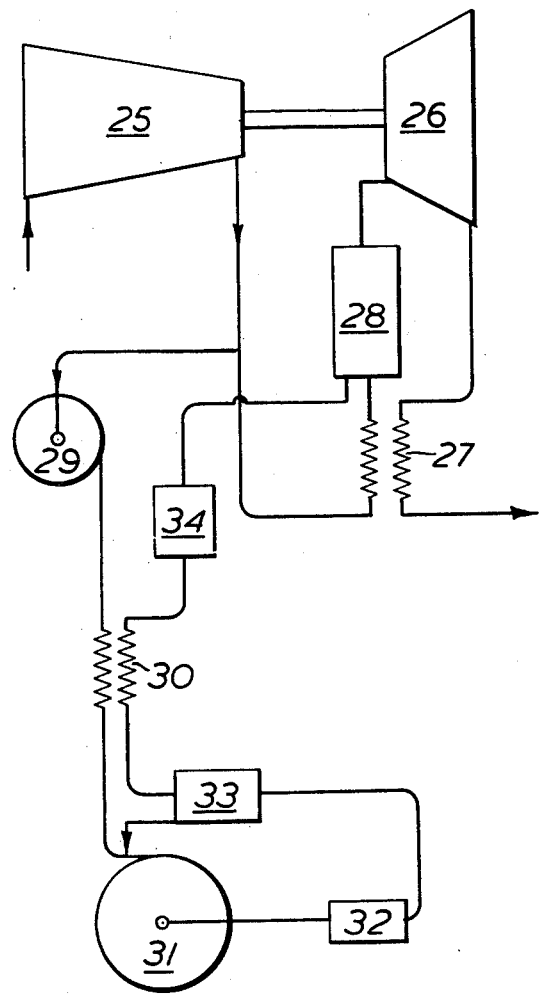

By way of example one form of the invention is hereunder described with reference to the accompanying drawings in which:

Figures 1 and 2 illustrate diagrammatically a side elevation and axial section respectively of one form of suitable gas producer, the section being taken on line II—II of Figure 1; and Figure 3 shows diagrammatically the layout of a gas turbine plant.

In Figures 1 and 2 a gaseous fluid which in the present case is air (preferably preheated and mixed with steam) is led through a tangential duct 1 into a vortex chamber 3 and thence flows radially inwardly through said chamber with a vortex motion before being discharged through an axial outlet 5. Liquid fuel primarily for combustion is injected by a nozzle 11a in the wake of a combustion-stabilising baffle 11b in the duct 1, whilst fuel, for example pulverised coal or coke, primarily for the gas-producing reaction is injected by a nozzle 11 at the axis of the chamber. The degree of atomisation may be so chosen, having regard to the whirl and radial velocity components of the flow and the nature of the material injected, that the fuel particles have equilibrium paths radially within the chamber 3 but outwardly of the outlet 5, so that they will gyrate in the chamber until consumed either by combustion or by the gas-producing reaction, the equilibrium paths of the primary (combustion) fuel particles preferably being of greater radius than those of the secondary (reaction) fuel particles. The total amount of fuel introduced is arranged to be in excess of the amount that can be burnt by the available air so that the outer zone of the chamber will, in general, tend to be a zone of combustion or oxidation and the inner zone one of reaction (reduction).

In the plant shown in Figure 3 a compressor 25 is driven by a gas turbine 26 to which it supplies air by way of the cold side of a heat exchanger 27 and a combustion chamber 28, the exhaust of the turbine passing through the hot side of the exchanger 27. Part of the compressor air is by-passed through a booster pump 29 and air heater 30 to a producer unit 31 which may be of the form shown in Figures 1 and 2.

It is assumed that the producer operates above the temperature of ash fusion and accordingly it has outlet through a slag removal chamber 32 in which the whirl velocity is utilised for centrifugal separation of slag and from which the gases pass to a steam generator 33 and thence by way of the air cleaner 30 and if necessary an auxiliary gas cleaner 34 to the combustion chamber 28. The steam generator 33 is used to inject steam into the producer 31 at its inlet.

If the nature of the fuel employed should permit the elimination of the slag removal and gas cleaning units, the producer could be connected directly to the combustion chamber 28, or through a steam generator to the combustion chamber.

The gas producer is of course not limited to the form described. For example the gas-producing fuel may be led tangentially into the vortex chamber and the central nozzle 11 may in this case be omitted. The conditions of operation may also be such that initially the equilibrium paths of the fuel particles have a radius equal to or greater than the vortex chamber.

I claim:

A gas producer for use with a turbine power plant or the like that comprises a vortex chamber having a tangential air inlet and an axial outlet, a liquid fuel injector at said inlet to inject liquid fuel particles into said chamber, a solid pulverized fuel injector located axially in said chamber to inject solid fuel particles into the stream of air and liquid fuel in said chamber, said injectors being proportioned relatively to each other and to the air inlet to inject fuel particles such that the equilibrium paths of the liquid fuel particles will be of greater radius than the equilibrium paths of the solid fuel particles thereby establishing an outer zone of oxidation and an inner zone of reduction, and to inject a total quantity of fuel in excess of the amount that can be burnt by the available air, and a flame stabilizing baffle being located around said liquid fuel injector.

References Cited in the file of this patent

UNITED STATES PATENTS

| 2,011,034 | Chilowsky | Aug. 13, 1935 |
| 2,156,121 | Macrae | Apr. 25, 1939 |
| 2,172,537 | Hilson et al. | Sept. 12, 1939 |
| 2,269,333 | Bloom | Jan. 6, 1942 |
| 2,302,156 | Totzek | Nov. 17, 1942 |
| 2,488,969 | Dietler | Nov. 22, 1949 |
| 2,496,407 | Pfenninger | Feb. 7, 1950 |
| 2,586,751 | Watson et al. | Feb. 19, 1952 |

FOREIGN PATENTS

| 338,108 | Great Britain | Nov. 3, 1930 |
| 401,868 | Great Britain | Nov. 23, 1933 |